COBB & HILL.

Machine for Filling Cylindrical Molds for Rubber Goods.

No. 3,193.

Reissued Nov. 17, 1868.

Witnesses:

J. M. Pope

J. R. Snow.

Inventors:

J. M. Cobb and E. A. Hill by their Attorney

R. H. Eddy.

N. PETERS. Photo-Lithographer, Washington, D. C.

United States Patent Office.

JOHN W. COBB, OF MELROSE, (FOR HIMSELF,) AND EDWIN A. HILL, (ASSIGNEE OF JOHN W. COBB,) OF QUINCY, MASSACHUSETTS.

*Letters Patent No.* 65,794, *dated June* 18, 1867; *reissue No.* 3,193, *dated November* 17, 1868.

IMPROVED MACHINE FOR FILLING CYLINDRICAL MOULDS FOR RUBBER GOODS.

The Schedule referred to in these Letters Patent and making part of the same.

*To all persons to whom these presents may come:*

Figure 1:
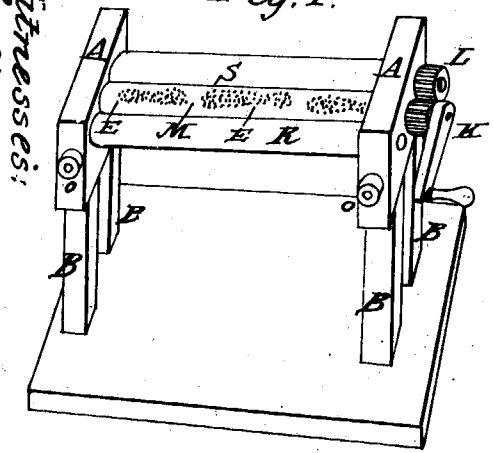
Figure 3:
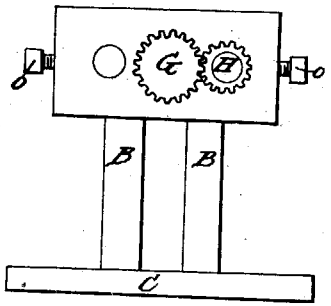

Whereas Letters Patent, No. 65,794, dated June 18, 1867, were granted to JOHN W. COBB, of Melrose, of the State of Massachusetts, for a Machine for Filling Cylindrical Moulds for Rubber Goods; and whereas we, the undersigned, the said JOHN W. COBB and EDWIN A. HILL, a resident of Quincy, of the State of Massachusetts, are joint and sole owners of such patent, by reason of the said JOHN W. COBB having assigned to the said EDWIN A. HILL one undivided half part of the exclusive property covered by such patent, as will appear by the records of the United States Patent Office; and whereas we, the undersigned, have applied for the reissue of the said patent, the specification and claims thereof being discovered by us defective or insufficient; now, therefore, we do hereby declare the invention to be fully described in the following specification, and represented in the accompanying drawings, of which Figure 1 is a perspective view,

Figure 2, a plan,

Figure 3, an end view, and

Figure 4:
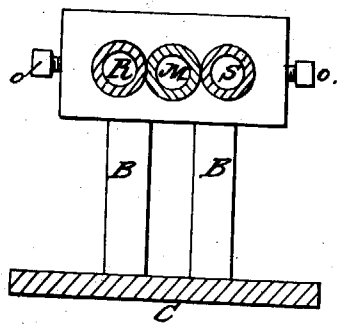

Figure 4, a transverse and vertical section of such machine.

In such drawings, C represents a floor or bed, upon which the machine is supported.

B B B B are four legs or standards, resting upon the floor or bed C, and being framed into end-pieces or head-blocks, A A, form therewith a support or frame for the main operative parts of the machine.

The parts A A are to be provided with suitable boxes or bearings for supporting the journals of their hollow cylinders or rollers S M R, which should have pipes, or means of introducing steam into them, for the purpose of keeping them at a proper temperature while the machine may be in operation.

Figure 2:
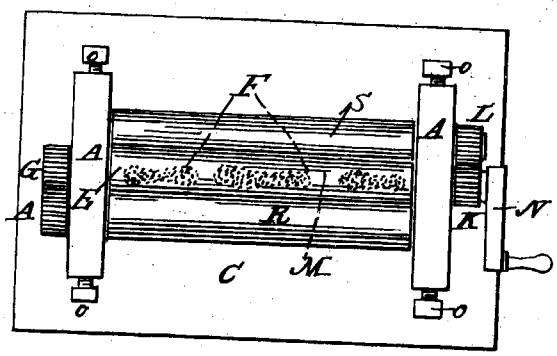

The middle cylinder or roller M is what may be termed the moulding-cylinder, it having one or more matrices or moulds formed in and below its curved surface, such moulds being shown at E F, in figs. 1 and 2.

The moulds exhibited in the drawings are intended for the moulding of ventilating-soles, of India rubber, or other vulcanizable material.

The cylinders S and M are geared together by the gears L K, so as to revolve with equal speeds, the object of the roller or cylinder S being to cause a piece of cloth, while passing between it and the moulding-cylinder, to adhere to the mass or masses of rubber or material contained in the mould or moulds of the cylinder, or to consolidate and smooth the moulded mass or masses in case the cloth may not be employed.

The cylinders or rollers M and R are geared together by the gears G H, (see figs. 2 and 3,) the gear G having a diameter greater than that of the gear H, the object being to cause the gear R to revolve with a velocity greater than that of the moulding-cylinder, in order that the rubber or material may be rubbed or ground into the mould or moulds of the cylinder M. This grinding or rubbing-action of the roller R affords a much better result than would be attained were the curved surfaces of the cylinders M and R to revolve at equal speeds.

This machine may be applied to the making of goods with raised figures, or to the manufacture of various other articles capable of being moulded by it.

In using it, the mass of rubber or material to be moulded is placed in the angular space between the top surfaces of the cylinders R and M, while they may be in revolution in the directions of the arrows shown in fig. 4, as directly over them. The cloth passes upward between the rollers M and S, the latter roller being revolved in a direction opposite to that of the moulding-cylinder.

We are well aware that rollers or cylinders, operating at different velocities, have been employed for the purpose of grinding India rubber, or compositions in which such was a constituent, and also for the purpose of working it into the meshes of cloth, and, consequently, we make no claim thereto as the invention of the said COBB.

What we do claim as the said COBB'S invention, is as follows:

We claim the combination of a moulding-cylinder, M, and a grinding-roller, R, substantially as described, and mechanism for revolving the two at different speeds, as and for the purpose explained.

We also claim the combination of the pressure-roller S, the moulding-cylinder M, and a grinding-roller, R, substantially as described, and mechanism for revolving the moulding-cylinder and grinding-roller at different speeds, as and for the purpose specified, the pressure-roller having applied to it mechanism for revolving it at the same speed with the moulding-cylinder.

JOHN W. COBB.
EDWIN A. HILL.

Witnesses:
R. H. EDDY,
F. P. HALE, JR.